Figure 1:
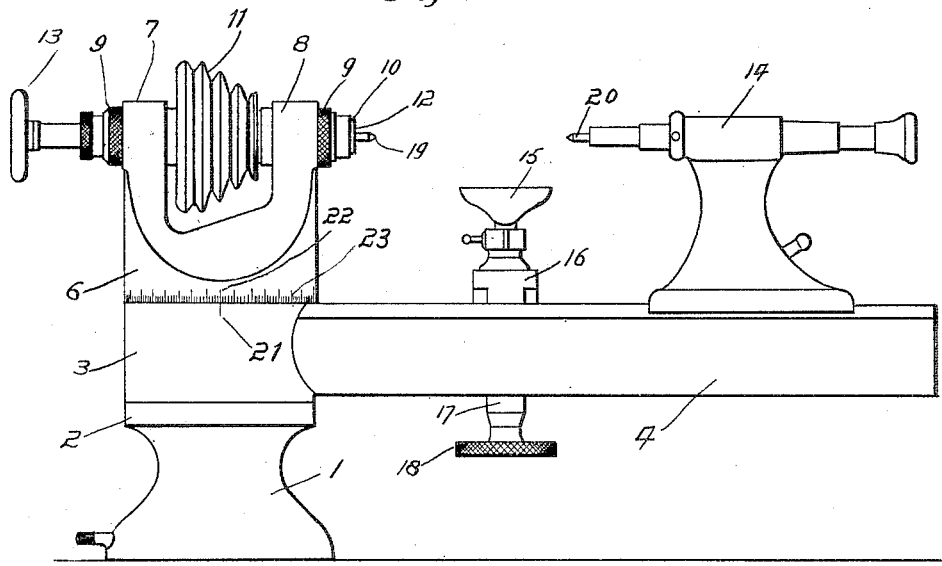

W. D. CLEMENT.
LATHE.
APPLICATION FILED JULY 29, 1918.

1,319,645.

Patented Oct. 21, 1919.
2 SHEETS—SHEET 1.

Inventor.
William D. Clement
by Heard Smith & Tennant
Attys.

W. D. CLEMENT.
LATHE.
APPLICATION FILED JULY 29, 1918.
1,319,645.
Patented Oct. 21, 1919.
2 SHEETS—SHEET 2.
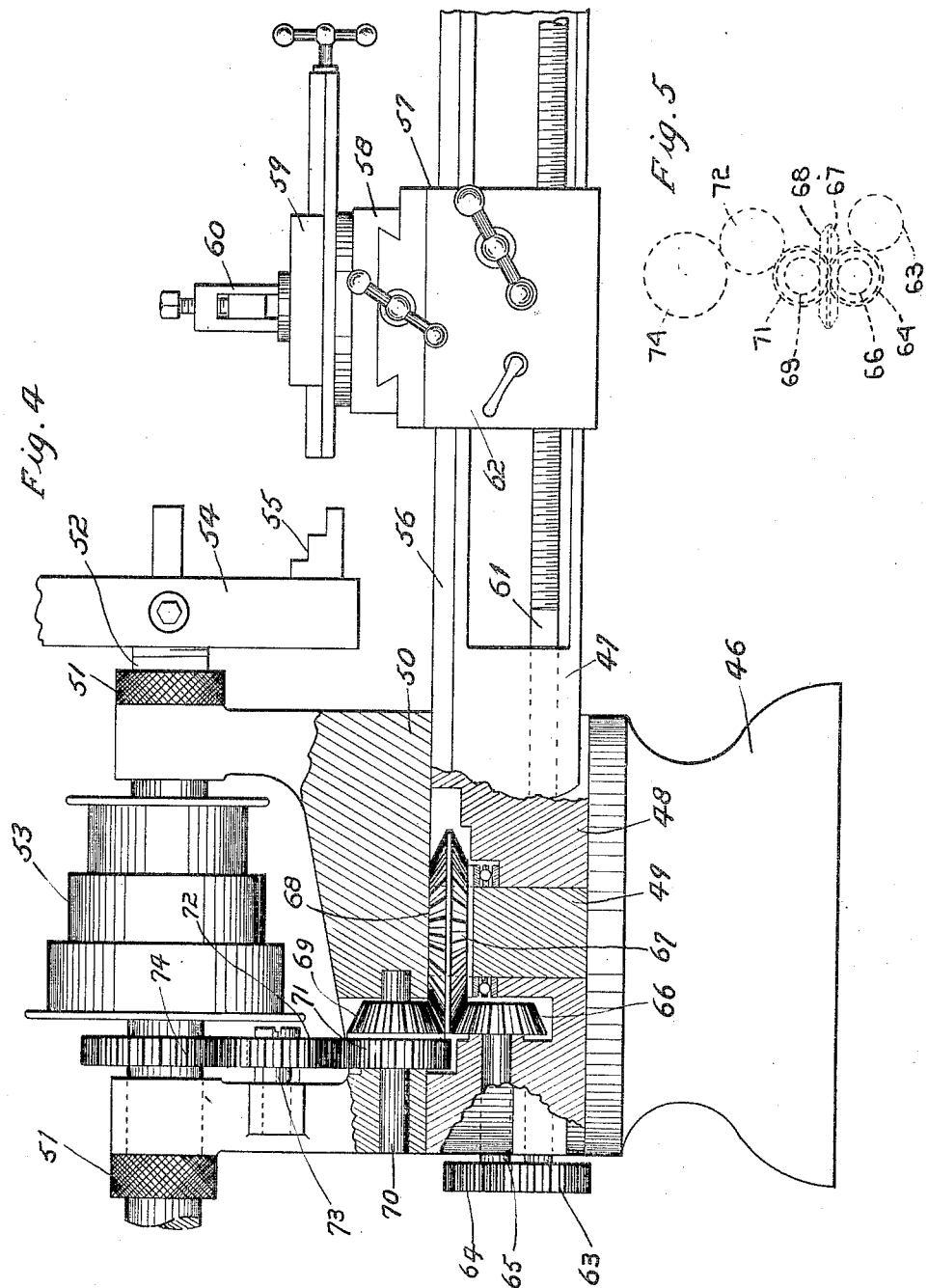
Inventor.
William D. Clement
by Heard Smith + Tennant
Attys.

UNITED STATES PATENT OFFICE.

WILLIAM D. CLEMENT, OF WALTHAM, MASSACHUSETTS.

LATHE.

1,319,645.  Specification of Letters Patent.  Patented Oct. 21, 1919.

Application filed July 29, 1918. Serial No. 247,130.

*To all whom it may concern:*

Be it known that I, WILLIAM D. CLEMENT, a citizen of the United States, and resident of Waltham, county of Middlesex, State of Massachusetts, have invented an Improvement in Lathes, of which the following description, in connection with the accompanying drawing, is a specification, like characters on the drawing representing like parts.

This invention relates to improvements in lathes and the general object thereof is to provide a lathe which will be capable of producing a greater variety of work than those heretofore constructed and which can be more conveniently placed aside when not in use.

One of the principal objects of the invention consists in providing a rotarily movable bed having means for clamping the same in any desired position relative to the axis of the live spindle of the head stock.

This construction is particularly desirable when applied to jewelers' bench lathes, for it permits the jeweler to swing the lathe from its operative position which is directly in front of him to a position at right angles thereto thereby giving him full freedom of his bench which in most cases is at best but two or three feet in length and is very restricted when the lathe is placed upon it in operative position.

By thus providing a rotarily movable bed plate the bed can be removed from beneath the live spindle of the head stock so as to permit pivot polishing and a variety of other kinds of work which may be done upon articles clamped in the chuck of the head stock.

A further object of the invention is to provide means for quickly locating the position of the bed at any desired angle relative to the axis of the live spindle of the head stock so that tapers of any desired length may be accurately turned upon material held by the chuck of the live spindle or undercut work of various kinds produced.

A further object of the invention is to provide a rotarily adjustable bed of the character described with a milling attachment which is adapted to be brought into operative relation with the live spindle of the head stock. The milling attachment preferably is located at the back of the bed so that when the lathe bed is swung back out of the way of the operator the milling attachment will likewise be out of the way.

Another object of the invention is to provide a head stock which may be rotarily adjusted about a vertical axis so that it may be positioned in any desired relation to the bed or to the milling attachment above mentioned.

A further feature of the invention comprises a novel means for securing the head stock in desired adjusted positions and in maintaining a rigid relation between the head stock, the bed and the supporting stand.

Another object of the invention is to provide a lathe having a rotarily adjustable bed and a carriage slidably movable thereon with means operating from the live spindle of the head stock for automatically reciprocating said carriage when the longitudinal axis of the bed is in the same vertical plane as the axis of the spindle or adjusted to any angular position in respect thereto, thus providing a universal engine lathe capable of producing a wider variety of work than lathes heretofore produced.

Other objects and features of the invention will more fully appear from the accompanying drawings and the following description and will be pointed out in the annexed claims.

In the drawings,

Figure 1 is a side view of a bench lathe embodying a preferred form of my invention.

Figure 3:
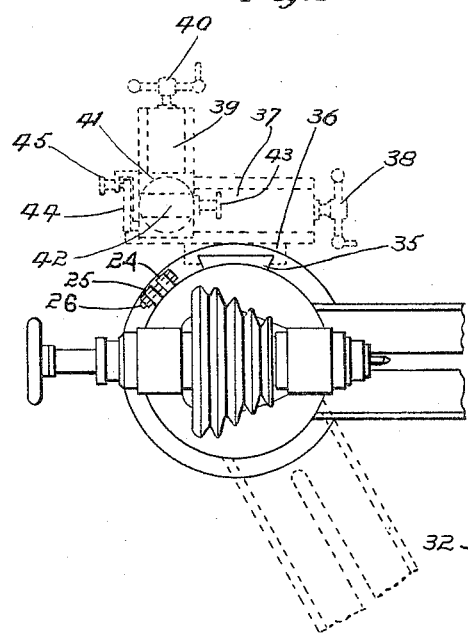
Figure 2:
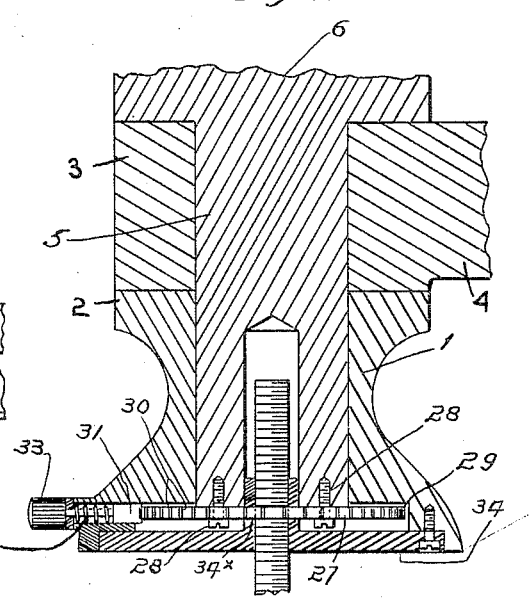

Fig. 2 is a vertical central sectional view of the bottom portion of the head stock, lathe bed and stand, Fig. 3 is a plan view of the lathe shown in Fig. 1 illustrating in dotted lines a milling attachment secured to the side of the head portion of the bed and also illustrating in dotted lines the position of the bed when placed in angular relation to the axis of the spindle of the head stock, Fig. 4 is a view partly in section and partly in side elevation of an engine lathe embodying my invention, means being provided for automatically reciprocating the carriage when the bed is in any desired position, and, Fig. 5 is a diagrammatical view of the gearing for transmitting movement from the live spindle to the carriage of the engine lathe shown in Fig. 4.

The present invention as above stated is particularly designed for the purpose of making a convenient jeweler's bench lathe which is adapted to perform a large variety of work and which may be permanently placed upon a bench so as at all times to be accessible to the jeweler but so constructed that when not in use as a lathe the bed can be swung backwardly at right angles to its normal position to give the jeweler full freedom of his bench. Such an arrangement also enables the jeweler to perform numerous operations upon material carried by the chuck of the lathe and in which there is no necessity for the use of a tool rest.

It also has the further advantage of permitting the jeweler to use a false tail stock secured to the bench in any suitable manner for the purpose of turning articles which are longer than the bed of the lathe or larger than it will accommodate.

The preferred embodiment of my invention in the bench lathe illustrated in Fig. 1 comprises a stand 1 having a cylindrical top 2 upon which is mounted the cylindrical head 3 of a lathe bed 4, the head 3 of the bed preferably being pivotally mounted upon a post 5 extending downwardly from the head stock 6.

The head stock 6 is provided with the usual upwardly extending bosses 7 and 8 forming journals for the sleeve 9 in which the live spindle 10 is rotatably mounted, said spindle being driven by a suitable cone pulley 11. The spindle 10 is provided with the usual chuck 12 which may be opened and closed by means of a hand wheel 13. The bed 4 may be provided with the usual tail stock 14 and with a tool rest 15 which may be slidably mounted upon a carriage 16 adapted to be secured in adjusted positions along the bed of the lathe by a clamp 17 operated by a screw having a knurled head 18. In the normal operation of the machine the axis of the live spindle 19 of the head stock and the axis of the dead spindle 20 of the tail stock lie in alinement and in order to position them properly in alinement the head 3 of the bed is provided with an indicating line 21 adapted to coincide with the line 22 upon the head stock 6.

In order to provide for a quick and accurate adjustment of the normal position of the bed 4 relative to the axis of the live spindle of the head stock the base of the head stock 6 is provided with a scale 23 which in coöperation with the index 21 upon the head 3 of the bed will indicate at once the angularity of the bed relatively to the axis of the live spindle.

In order to retain the bed in adjusted position the head 3 desirably is in the form of a split ring having laterally extending ears 24, 25 which may be drawn together by a bolt 26 to clamp the same firmly upon the post 5 which extends downwardly from the head stock 6. The head stock may also be rotarily adjustable to provide a more universal adjustment for the lathe. As illustrated herein the post 5 extends centrally downwardly into the stand 1 and has secured to its bottom a circular preferably spring disk 27 which is secured to said post by a series of screws 28. The outer edge of the disk 27 engages a peripheral rib 29 and as the disk 27 is secured to the post 5 by the screws 28 a sufficient amount of tension may be imposed upon said disk to cause the head stock to be drawn down firmly upon the head 3 of the bed to clamp the latter against the upper face of the stand 1.

The periphery of the spring disk 27 desirably is provided with notches 30 adapted to be engaged by a latch 31 slidably mounted in ways in the stand 1, said latch being normally forced into operative engagement with the notches 30 by a spring 32 surrounding the stem of said latch. The outer end of the stem is provided with a knurled head 33 by means of which the latch 31 may be withdrawn from the notches 30 in the spring disk 27 so that the head can be rotated to any desired position.

By thus providing a rotarily movable bed and also a rotarily movable head, both being rotatable about the same axis, means are provided to enable the accomplishment of a great variety of work which could not be produced upon lathes heretofore manufactured.

The stand 1 may be clamped to the bench in any suitable manner. As illustrated herein it is provided with a plate 34 which sets in a suitable recess in the base of said stand and is secured to said stand by screws. The central portion of the plate 34 is provided with an upwardly extending internally threaded boss 34$^x$ adapted to receive a screw for securing the same to the bench.

A further feature of the invention consists in providing the head 3 of the lathe bed 4 with a laterally extending guideway 35 to which the base 36 of a milling attachment may be secured, such a milling attachment is illustrated in Fig. 3 and comprises a slide 37 adapted to be adjusted laterally by a hand screw 38. The slide 37 has mounted upon it a transverse slide 39 which is operated by a hand screw 40. The slide 39 carries an indexing head 41 having a shaft 42 carrying a chuck for holding the work to be milled 43. Said shaft 42 at its opposite end is connected to a lever 44 operable by a hand control 45.

In the operation of the machine a suitable milling cutter may be placed upon the live spindle in the head stock and the gear or other device to be milled carried by the shaft or chuck of the indexing head, said head being positioned in proper relation to the cutter by manipulating the slides 37 and 39 through their hand screws 38 and 40.

In Fig. 4 I have illustrated a further embodiment of my invention adapted to be incorporated either in a bench lathe of the type above described or preferably in an engine lathe of considerably larger size. The lathe which is illustrated in Fig. 4 comprises the stand 46 which may be substantially the same as the stand 1 heretofore described. The bed 47 is provided with a cylindrical head 48 pivotally mounted upon a post 49 which extends downwardly and is integral with the head stock 50. The lower end of the post 49 may be secured in place in the manner illustrated in Fig. 3. The head stock 50 is provided with usual sleeves 51 for the live spindle 52 which is driven through the cone pulley 53 directly secured to said spindle. The end of the spindle as illustrated in Fig. 4 is provided with a chuck 54 having adjustable stepped jaws 55 in which an article to be turned may be centered and clamped.

The bed 47 is provided with a flat top 56 forming ways for a carriage 57 provided with the usual cross slide 58 and an angularly adjustable slide 59 supporting a tool post 60. The side of the bed 47 is recessed to receive and conceal the screw 61 which is engaged by a suitable nut upon the back side of the apron 62 which depends from and forms a part of the carriage 57. One of the important features of the invention consists in providing means for automatically driving the carriage 57 when the bed is in any position of angular adjustment relative to the axis of the live spindle of the head stock.

This is accomplished in the preferred embodiment of the invention shown herein by providing the screw 61 with a gear 63 which is engaged by a gear 64 on a stud shaft 65 which has upon its opposite end a gear 66 which meshes with the under face of a compound gear 67 rotatably journaled upon the post 49.

The compound gear has an upper toothed surface 68 which is engaged by a beveled gear 69 on a stud shaft 70, another gear 71 being formed integrally with or connected to the gear 69. For convenience in manufacture these gears may be made separately and secured together or of course, may be made integral.

The gear 71 meshes with an idle gear 72 mounted upon a stud 73 and meshes with a gear 74 rigidly secured upon the spindle 52. By reason of the fact that the gears 69 to 71 are so mounted as to be capable of rotating about the axis of the post 49 and since the compound gear 67, 68 which drives the screw 63 is mounted upon the post 49 means are provided whereby the screw 61 may be operated with the bed of the lathe in any desired adjustment relative to the axis of the live spindle so that tapers of various kinds may be turned upon material secured to the live spindle, ball raceways turned and a very great variety of work accomplished which no lathe has heretofore been capable of turning out. Furthermore by reason of the capability of rotarily adjusting the head in the manner heretofore disclosed still further capabilities of operation are obtained as will be readily understood by those skilled in the art.

It will be understood that the form of engine lathe illustrated in Fig. 3 may also be provided with a milling attachment of the character heretofore described with the attendant advantages obtained thereby.

It will be understood that the embodiments of the invention disclosed herein are of an illustrative character and not restrictive and that various modifications may be made within the meaning and scope of the following claims.

Having thus described my invention what I claim as new and desire to secure by Letters Patent is:

1. A lathe comprising a stand, a headstock and a bed pivotally mounted upon said stand and independently rotarily adjustable about a common axis and means for securing said head stock and bed in relatively adjusted positions.

2. A lathe comprising a stand, a headstock having a vertical post rotatably mounted upon said stand, a bed pivotally mounted upon said post, means for rotarily adjusting said head stock and bed relatively to said stand.

3. A lathe comprising a stand, a headstock and a bed pivotally mounted upon said stand and independently rotarily adjustable about a common axis, means for securing said head-stock and bed in relatively adjusted position and a coöperating scale and index upon said head stock and bed whereby the relatively angular adjustment of said head stock and bed may be accurately determined.

4. A lathe comprising a stand, a head stock having a vertical post rotatably mounted in said stand, a bed mounted upon said post and an independent means for adjusting both said head stock and said bed about the axis of said post.

5. A lathe comprising a stand, a head stock connected thereto and a bed pivotally mounted upon said stand to swing horizontally, means for securing said bed in adjusted positions and a scale and index upon said head stock and bed whereby the relative angular adjustment of the head stock and bed may be accurately determined.

6. A lathe comprising a stand, a head stock having a vertical post rotatably mounted in said stand, a bed having a head forming a split sleeve rotatably mounted upon said post, means for clamping the portion of said sleeve upon said post in adjusted positions.

7. A lathe comprising a stand, a bed, a head stock having a vertical post rotatably mounted in said stand, means for securing said head stock in adjusted positions comprising a notched disk secured to said post and locking means engaging the notches in said disk.

8. A lathe comprising a stand having a rib near its periphery, a bed, a head stock having a vertical post rotatably mounted in said stand, a spring plate secured to the bottom of said post and bearing upon said rib thereby maintaining the assembled position of said head stock, bed and stand, and locking means engaging said spring plate adapted to secure the head stock in rotarily adjusted positions.

9. A lathe comprising a stand and head stock secured thereto, a bed having a head rotatably mounted upon said stand, vertical ways upon said head to support mechanisms adapted to coöperate with the spindle of said head stock.

10. A lathe comprising a stand, a head stock rotarily mounted upon said stand, a bed having a head rotatably secured to said stand, a milling attachment carried by the head on said bed and means for securing said head stock in adjusted positions whereby it may be adjusted to coöperate either with said bed or with said milling attachment.

11. A lathe comprising a stand, a head stock and a bed pivotally mounted upon said stand and independently rotarily adjustable about a vertical axis, a spindle rotatably mounted in said head stock and means for actuating the same, a carriage mounted on said bed and means for automatically actuating said carriage from said spindle in any adjusted positions of the bed or head stock.

12. A lathe comprising a stand, a head stock having a vertical rotarily adjustable central post, a spindle carried by said head stock and means for rotating said spindle, a bed having a head rotarily mounted upon said post, a carriage movable longitudinally of said bed and means for actuating said carriage from the spindle of the head stock.

13. A lathe comprising a stand, a head stock having a vertical rotarily adjustable post mounted in said stand and provided with a rotatable spindle, a bed rotarily mounted upon said post and means for securing said bed in adjusted positions, a carriage slidably mounted upon said bed and means for actuating the same from said spindle when the bed is in any position.

14. A lathe comprising a stand, a head stock having a vertical post mounted in said stand and provided with a rotatable spindle, a bed rotarily mounted upon said post and means for securing said bed in adjusted position, a carriage slidably mounted on said bed, a gear rotatably mounted upon said post, means for rotating said gear from said spindle and means actuated by said gear for propelling said carriage.

In testimony whereof, I have signed my name to this specification.

WILLIAM D. CLEMENT.

Copies of this patent may be obtained for five cents each, by addressing the "Commissioner of Patents, Washington, D. C."